(12) United States Patent
Hosseini

(10) Patent No.: US 12,687,429 B2
(45) Date of Patent: Jul. 21, 2026

(54) SYSTEMS AND METHODS FOR MINIATURE SPATIAL HETERODYNE SPECTROMETRY

(71) Applicant: California Institute of Technology, Pasadena, CA (US)

(72) Inventor: Seyedeh Sona Hosseini, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 71 days.

(21) Appl. No.: 18/667,894

(22) Filed: May 17, 2024

(65) Prior Publication Data

US 2024/0385035 A1     Nov. 21, 2024

Related U.S. Application Data

(60) Provisional application No. 63/467,380, filed on May 18, 2023.

(51) Int. Cl.
| | |
|---|---|
| *G01J 3/28* | (2006.01) |
| *G01J 3/02* | (2006.01) |
| *G01J 3/12* | (2006.01) |

(52) U.S. Cl.
CPC .......... *G01J 3/0208* (2013.01); *G01J 3/0256* (2013.01); *G01J 3/0272* (2013.01); *G01J 3/12* (2013.01); *G01J 3/2823* (2013.01); *G01J 2003/1204* (2013.01)

(58) Field of Classification Search
CPC ...... G01J 3/0208; G01J 3/0256; G01J 3/0272; G01J 3/12; G01J 3/14; G01J 3/45; G01J 3/2823; G01J 2003/1204; G01B 9/02
See application file for complete search history.

(56) References Cited

U.S. PATENT DOCUMENTS

| | | | | | |
|---|---|---|---|---|---|
| 8,810,796 | B2 * | 8/2014 | Hays | ....................... | G01S 17/58 |
| | | | | | 356/519 |
| 10,041,880 | B2 * | 8/2018 | Stockwell | .............. | G01N 21/45 |
| 2007/0159634 | A1 * | 7/2007 | Englert | ................. | G01J 3/4531 |
| | | | | | 356/450 |
| 2009/0231592 | A1 * | 9/2009 | Harlander | ............. | G01J 3/4531 |
| | | | | | 356/456 |

(Continued)

FOREIGN PATENT DOCUMENTS

| | | |
|---|---|---|
| BY | 8490 U | 8/2012 |
| CN | 105157840 A | * 12/2015 |

(Continued)

OTHER PUBLICATIONS

Canon USA (2018) "Canon 120MXS 120MP CMOS Sensor", https://www.youtube.com/watch?v=40yruxcr-yQ.

(Continued)

*Primary Examiner* — Abdullahi Nur
(74) *Attorney, Agent, or Firm* — Christian S. Hans; Bozicevic, Field & Francis LLP

(57) ABSTRACT

Systems and methods for miniature spatial heterodyne spectrometer (SHS) systems are described. Methods for optimizing the miniature SHS systems can reduce the sizes and format while achieving high sensitivity and detection quality. The miniature SHS systems can be deployed for handheld use in real-world or remote activities outside of research or diagnostic facilities.

22 Claims, 12 Drawing Sheets

100

(56)                  References Cited

U.S. PATENT DOCUMENTS

| | | | | |
|---|---|---|---|---|
| 2013/0188181 A1* | 7/2013 | Angel | .................... | G01J 3/4531 |
| | | | | 356/301 |
| 2014/0029004 A1* | 1/2014 | Bodkin | ................. | G01J 3/2823 |
| | | | | 356/328 |
| 2014/0247447 A1 | 9/2014 | Angel et al. | | |
| 2015/0241280 A1* | 8/2015 | Lenzner | ................ | G01J 3/1804 |
| | | | | 356/451 |
| 2021/0003450 A1 | 1/2021 | Hunter et al. | | |
| 2021/0302305 A1* | 9/2021 | Hosseini | .............. | G01J 3/4531 |
| 2022/0397531 A1* | 12/2022 | Angel | .................... | G01N 21/65 |

FOREIGN PATENT DOCUMENTS

| | | | | |
|---|---|---|---|---|
| CN | 106918393 | 7/2017 | | |
| CN | 105300521 | 11/2019 | | |
| CN | 112504457 A | * 3/2021 | ................ | G01J 3/45 |
| CN | 112556842 A | * 3/2021 | ............ | G01J 3/0205 |
| WO | WO-2014042642 A1 | * 3/2014 | ............ | G01J 3/0291 |

OTHER PUBLICATIONS

Dawson et al., (2009) "Tunable, all-reflective spatial heterodyne spectrometer for broadband spectral line studies in the visible and near-ultraviolet", Applied Optics, 48(21):4227-4238.

Englert et al., (2005) "Correction of Phase Distortion in Spatial Heterodyne Spectroscopy", Optical Society of America. https://doi.org/10.1364/FTS.2005.FTuB2.

Harlander et al., (2010) "First results from an all-reflection spatial heterodyne spectrometer with broad spectral coverage", Optics Express, 18(6):6205-6210.

Harris et al., (2004) "Applications of reflective spatial heterodyne spectroscopy to UV exploration in the Solar System", Proceedings of SPIE, 5488:886-897.

Hosseini et al., (2012) "Khayyam: a tunable spatial heterodyne spectrometer for observing diffuse emission line targets", SPIE Digital Library, 8446: https://doi.org/10.1117/12.925513.

Kaufmann et al., (2017)"A highly miniaturized satellite payload based on a spatial heterodyne spectrometer for atmospheric temperature measurements in the mesosphere and lower thermosphere", Atmospheric Measurement Techniques, 11(7):3861-3870.

Kruse (2019) "LOWSPEC Spectrometer—Part 1—3D Printing", https://www.youtube.com/watch?v=Wac5asXagEQ.

Qiu, (2018) "Broadband transmission Raman measurements using a field-widened spatial heterodyne Raman spectrometer with mosaic grating structure", Optics Express, 26(10): 26106-26119.

* cited by examiner

SYSTEMS AND METHODS FOR MINIATURE SPATIAL HETERODYNE SPECTROMETRY

CROSS-REFERENCE TO RELATED APPLICATIONS

The current application claims the benefit, under 35 U.S.C. § 119(e), of U.S. Provisional Patent Application No. 63/467,380, entitled "Miniature Spatial Heterodyne Spectrometer Systems" filed May 18, 2023. The disclosure of U.S. Provisional Patent Application No. 63/467,380 is hereby incorporated by reference in its entirety for all purposes.

STATEMENT REGARDING FEDERALLY SPONSORED RESEARCH OR DEVELOPMENT

This invention was made with government support under Grant No. 80NMO0018D0004 awarded by NASA (JPL). The government has certain rights in the invention.

FIELD OF THE INVENTION

The present disclosure is directed to spatial heterodyne spectrometers, particularly to systems and methods for spatial heterodyne spectrometers with reduced size.

BACKGROUND

Low-resolution spectroscopy allows the study of basic parameters like composition, distribution, intensity, and energy distribution. In contrast, high-resolution spectroscopy can reveal additional information about the physical characteristics of a source, such as a velocity, temperature, pressure, isotopic signatures, etc. High-resolution spectroscopy carries more information than low-resolution spectroscopy. Yet, the cost of the added information must be balanced against other restrictive factors, most importantly size and mass of the instrument and the maintenance of optics' alignment.

Many high-resolution spectrometers are large, bulky, and require to be paired with large input optics (such as large telescope or large microscopes) or have an excess mass that makes them insufficient to be deployed in the field such as in space and/or on robotic platforms. Efforts to reduce instrument size result in lower data quality or resolution As such, a need exists in the art for spectrometers with a small form factor to deploy in space or on planetary bodies, where reduced size and mass are essential features for use and maintain data quality.

SUMMARY OF THE INVENTION

Systems and methods for miniature spatial heterodyne spectrometer (SHS) systems are described. Methods for optimizing the miniature SHS systems can reduce the sizes and format while achieving high sensitivity and detection quality. The miniature SHS systems can be deployed for handheld use in real-world or remote activities outside of research or diagnostic facilities.

This summary is meant to provide some examples and is not intended to be limiting of the scope of the invention in any way. For example, any feature included in an example of this summary is not required by the claims, unless the claims explicitly recite the features. Various features and steps as described elsewhere in this disclosure may be included in the examples summarized here, and the features and steps described here and elsewhere can be combined in a variety of ways.

Other features and advantages of the present invention will become apparent from the following detailed description, taken in conjunction with the accompanying drawings which illustrate, by way of example, the principles of the invention.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
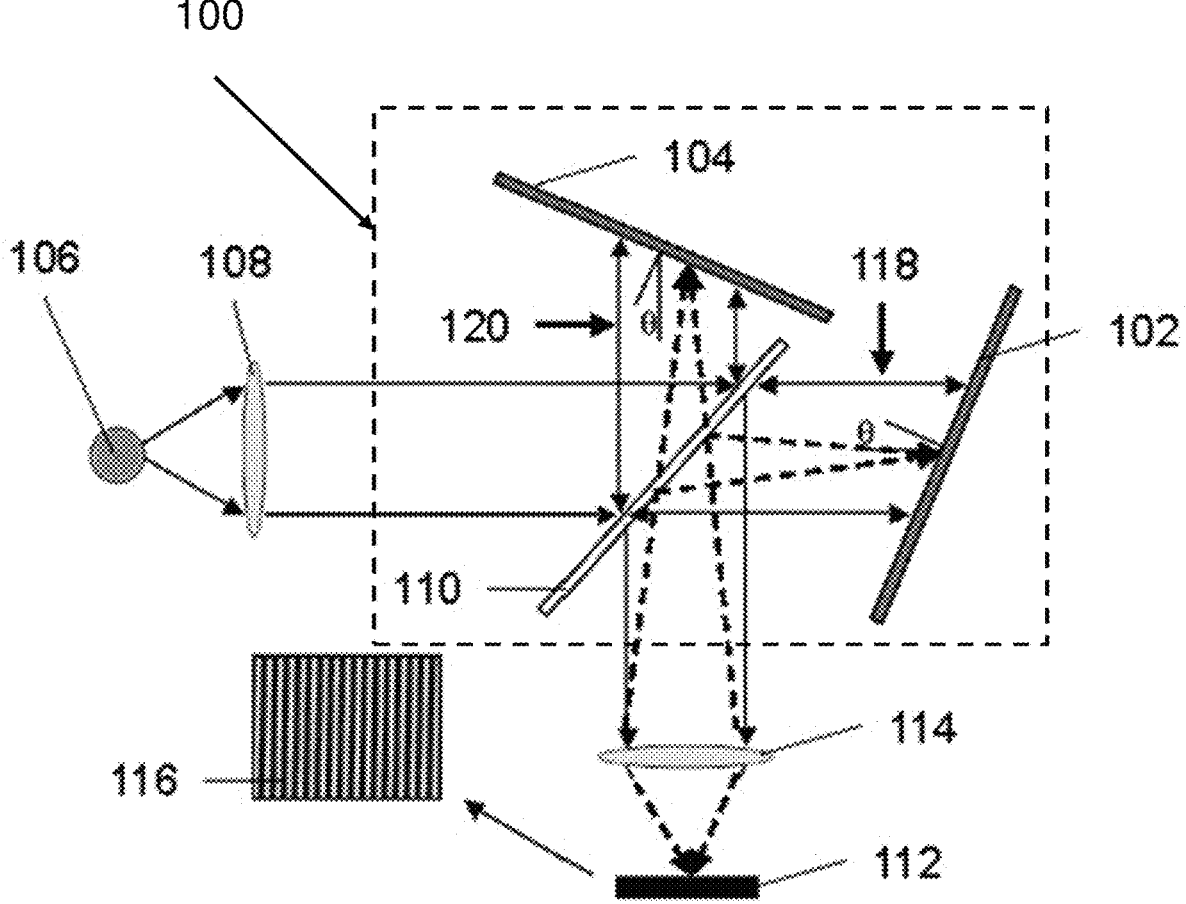
FIG. 1 illustrates a schematic of SHS with collimating optics and imaging optics in accordance with an embodiment.

Before the systems and methods for miniature spatial heterodyne spectroscopy of the present disclosure are described in greater detail, it is to be understood that the systems and methods for miniature spatial heterodyne spectroscopy are not limited to particular embodiments described, as such may, of course, vary. It is also to be understood that the terminology used herein is for the purpose of describing particular embodiments only, and is not intended to be limiting, since the scope of the systems and methods for miniature spatial heterodyne spectroscopy will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the systems and methods for miniatures spatial heterodyne spectroscopy. The upper and lower limits of these smaller ranges may independently be included in the smaller ranges and are also encompassed within the systems and methods for miniatures spatial heterodyne spectroscopy, subject to any specifically excluded limit in the stated range. Where the stated range includes one or both of the limits, ranges excluding either or both of those included limits are also included in the systems and methods for miniatures spatial heterodyne spectroscopy.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which the systems and methods for miniatures spatial heterodyne spectroscopy belong. Although any systems and methods for miniatures spatial heterodyne spectroscopy similar or equivalent to those described herein can also be used in the practice or testing of the systems and methods for miniatures spatial heterodyne spectroscopy, representative illustrative systems and methods for miniatures spatial heterodyne spectroscopy are now described.

All publications and patents cited in this specification are herein incorporated by reference as if each individual publication or patent were specifically and individually indicated to be incorporated by reference and are incorporated herein by reference to disclose and describe the materials and/or methods in connection with which the publications are cited. The citation of any publication is for its disclosure prior to the filing date and should not be construed as an admission that the present systems and methods for miniatures spatial heterodyne spectroscopy are not entitled to antedate such publication, as the date of publication provided may be different from the actual publication date which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It is appreciated that certain features of the systems and methods for miniatures spatial heterodyne spectroscopy, which are, for clarity, described in the context of separate embodiments, may also be provided in combination in a single embodiment. Conversely, various features of the systems and methods for miniatures spatial heterodyne spectroscopy, which are, for brevity, described in the context of a single embodiment, may also be provided separately or in any suitable sub-combination. All combinations of the embodiments are specifically embraced by the present disclosure and are disclosed herein just as if each and every combination was individually and explicitly disclosed, to the extent that such combinations embrace operable processes and/or compositions. In addition, all sub-combinations listed in the embodiments describing such variables are also specifically embraced by the present systems and methods for miniatures spatial heterodyne spectroscopy and are disclosed herein just as if each and every such sub-combination was individually and explicitly disclosed herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present methods. Any recited method can be carried out in the order of events recited or in any other order that is logically possible.

DEFINITIONS

As used herein, the term "filter" refers to a device or material that selectively transmits light of certain wavelengths while blocking or reflecting others. Filters are used to control the spectrum of light, allowing specific wavelengths to pass through while filtering out unwanted wavelengths. Optical filters can be made from various materials, including glass, plastic, and optical coatings and can be used to enhance image quality, protect sensors and/or detectors, or perform specific spectral analysis. Filters can include one or more of a long pass filter, a short pass filter, and a bandpass filter, where a long pass filter allows transmission of light above prescribed wavelength, a short pass filter allows transmission of light below a prescribed wavelength, and a band pass filter allows transmission of light within a prescribed range of wavelengths.

As used herein, the term "optical axis" refers to an imaginary line that defines the path along which light propagates through an optical system, such as a lens, mirror, or other optical components. It represents the axis of symmetry for the optical elements and is typically aligned with the center of these components. Light rays entering the system parallel to the optical axis will ideally converge at a focal point or remain parallel after passing through the system.

As used herein a "lens" refers to an optical device made of transparent material that refracts (bends) light rays to converge or diverge them to form an image. Lenses are designed with curved surfaces that focus light through refraction according to the lens's shape and material.

As used herein, the term "power element" refers to an optical component that has the ability to converge or diverge light rays. The term "power" in this context is related to the optical power of the element, which is a measure of its ability to bend light. Optical power is defined as the reciprocal of the focal length of the optical component.

Spatial Heterodyne Spectroscopy

Spectroscopy targets cover a vast range of sizes and environments that present a challenge to spectroscopic observers. Current spectroscopic techniques fall short in addressing high resolving power (R) observations at wide field-of-view (FOV) and high throughput. Most existing conventional instrumental designs lose their sensitivity by going to lower resolution and lower throughput. This type of sensitivity trade-off presents fewer challenges for point sources or very small sources, but it restricts the spectroscopic investigation of the extended sources. For example, in astronomy, the velocity of a galaxy that is moving with the relative velocity of 600 km/sec can be detected with an instrument with an R of ~500. By contrast, the velocity distributions in comets cover a range of 1-100 km/s, which requires R up to 100,000 to detect the corresponding Doppler shift. In addition, the faintness and angular extent of many of the target emissions and the volume limitations of remote probes and small spacecraft restrict the opportunities for incorporating a high spectral resolution capability and requires a need for high-throughput, compact—for space probe applications as well as field commercial applications—and high-resolution spectral sensors.

Spatial heterodyne spectrometers (SHSs) are a type of Fourier transform spectrometer that is used to measure the spectrum of light from a source. Unlike traditional spectrometers that use dispersive elements like prisms or diffraction gratings to spread light into its constituent wavelengths, SHS operates based on the principles of interferometry. In SHS, incoming light is split into multiple beams, which are then recombined to interfere with each other.

The advantage of SHS over traditional Fourier transform spectrometers is that they can provide high resolution spectroscopy in a small and rugged package. This makes them ideal for remote sensing applications, such as studying the atmosphere or the surface of other planets. SHS instruments are also used in applications such as plasma physics, laser diagnostics, and materials science. SHS provides this capability in a compact, no-moving-parts, and mechanically stable configuration. SHS could be implemented on a dedicated platform that can sit and stare at the target for a long duration of time that cannot be done from the big mission.

The state of the art for SHS instruments with all optical sub-systems still has large formats such as the size of a microwave oven or a mini refrigerator, which restricts their portability, affordability, versatility, and ability to be deployed in the field—e.g., outside of a laboratory environment and/or where samples originate. The underlying reason is the optimization process of all sub-systems, which is done separately due to complex Fourier analysis tied to understanding driving factors and aberrations to enable better system optimization and miniaturization and maintaining data quality.

SHS Systems

Many embodiments provide systems for miniature SHS systems and methods for minimizing the SHS systems. Miniature SHS systems with high sensitivity are valuable tools for a variety of applications, offering portability, affordability, versatility, and rapid analysis capabilities. For commercial applications, miniature SHS systems have several advantages. First, miniature SHSs have great portability. Miniature spectrometers are compact and lightweight, making them easy to transport and use in the field or in remote locations. This can be particularly useful for applications such as environmental monitoring, agriculture, geology, and medical applications where samples may need to be analyzed on-site and/or in a timely manner. Second, miniature SHS systems offer affordability. Miniature SHS systems are less expensive than larger, more complex instruments and easier to mass produce. This makes them accessible to a wider range of users, including large and small businesses, academic researchers, and hobbyists. Third, miniature SHS systems are versatile. Many small spectrometers are designed for a wide range of applications, from food and beverage analysis to pharmaceuticals and materials science. This versatility makes them useful for a variety of industries and research fields. Lastly, miniature SHS systems can be used for rapid analysis. Miniature spectrometers can provide real-time analysis of samples, allowing for faster decisionmaking and process optimization. This can be useful in industries such as manufacturing, where quick and accurate analysis can improve production efficiency and quality control.

Turning to FIG. 1, a spatial heterodyne spectrometer (SHS) configuration 100 of many embodiments is similar to a Michelson design SHS (MSHS). Unlike a Michelson interferometer configuration, embodiments herein use reflection diffraction gratings in each interferometer arm in lieu of the mirrors of an MSHS. An "arm" is considered the path that light takes from entering SHS core to a grating. The Michelson Spatial Heterodyne Spectrometer (MSHS) is an interferometer that can observe targeted atomic and molecular spectral lines at high spectral resolution. An MSHS is generally tailored to a target wavelength region (UV to VIS) with a detector, such as a 2-dimensional (2D) solid-state array imaging sensor that produces records of the optical interference fringes, whose Fourier transform produces high-resolution spectra. With its high optical throughput (étendue) and wide field of view (FOV), it has a high sensitivity to weak or diffuse sources such as the ability to measure biomarkers, both organic and inorganic, minerals, water, and $CO_2$ ice.

As illustrated in FIG. 1, the interferometer configuration (or SHS core) 100 in accordance with various embodiments possesses a centrally located beam-splitter 110 surrounded by reflective elements 102, 104 forming a 90° angle, such that beam-splitter 110 is the vertex of the 90° angle. In several embodiments, each reflective elements 102, 104 is tilted at an angle θ. Reflective elements 102, 104 can be a mirror, grating, and/or any other surface capable of reflecting light. In various embodiments, the reflective elements are reflection diffraction gratings. In many embodiments, the arms of the SHS core 100 are symmetrical to each other, thus the path of light from a beam splitter 110 to a grating 102, 104 and back is equal. Additionally, as light is divided into each arm by beam splitter 110, the arms are functionally identical.

In many embodiments, light emitted from a field of view 106 is collimated via a collimator 108, such as a collimating lens, mirror, or other optical elements capable of collimating light. Collimated light intercepts the beam-splitter 110 90° from one of the reflective elements 102, 104. The beam-splitter 110 directs collimated light to reflective elements 102, 104. One or both reflective elements 102, 104 can be moved via an interferometer arm. For example, reflective element 102 can be moved along an axis parallel to the collimated light from collimator 108 to beam-splitter 110, while reflective element 104 can be moved along an axis perpendicular to the collimated light from collimator 108 to beam-splitter 110. Gratings 102, 104 diffract light back toward beam-splitter 110, where the diffracted light is recombined and directed toward a detector 112, such as a camera or other imaging sensor. Some embodiments include additional optics 114 to focus recombined light to detector 112. Light collimated into the system emerges as crossed wavefronts, which interfere creates a Fizeau fringe pattern 116.

The FOV is significant for SHS because it increases the étendue of the instrument, the capability of an optical system to accept and gather light ($\acute{E}=FOV \times A_{eff}$; where $A_{eff}$ is the collecting area). Provided the source is extended, and aperture-filling, the FOV of the SHS can fill the same role that a large input optics does for a grating spectrometer. The measure of étendue is widely used to express the sensitivity of an optical instrument.

Field-widening usually involves adding at least one optical element into the SHS core 100 with the goal of making beams from outside the FOV appear to be within the FOV limits, widening the instrument's FOV. The instrument's throughput is increased (without a significant increase in input optical system size), leading to higher sensitivity that provides faster and better data gathering while retaining the advantages of the conventional SHS. In short, field-widening, if done successfully, enables a smaller, lighter SHS that can be very useful for applications requiring minimal volume and weight loadings (e.g., space exploration, portable commercial applications).

In several embodiments, the SHS core 100 is field-widened by inserting prisms at positions 118, 120. Such prisms can be wedge prisms so that, when reflective elements 102, 104 are viewed from the output, they appear rotated to be co-linear. Field-widening can increase the SHS étendue by a couple of orders of magnitude over the basic configuration, making it very useful for diffuse-source observations.

In various embodiments, the angle of the prism is based on a desired heterodyne wavelength, index of refraction of a construction material, and frequency of the first and second gratings. In many instances, a trade between spectral bandpass and resolution may occur when determining prism angle. To determine prism angle for filed widening, various embodiments use equation (1):

$$2(n^2 - 1)\tan\gamma - n^2\tan\theta \tag{1}$$

Using the relationship of equation (2):

$$n\sin\left(\frac{\alpha}{2}\right) - \sin\gamma \tag{2}$$

The prism angle can be determined in accordance with equation (3):

$$\alpha = 2\sin^{-1}\left[\frac{\sin\left[\tan^{-1}\left[\frac{n^2\tan\theta}{2(n^2 - 1)}\right]\right]}{n}\right] \tag{3}$$

Where $\theta$ is the Littrow angle of a grating and n is the prism index of refraction.

Figure 2:
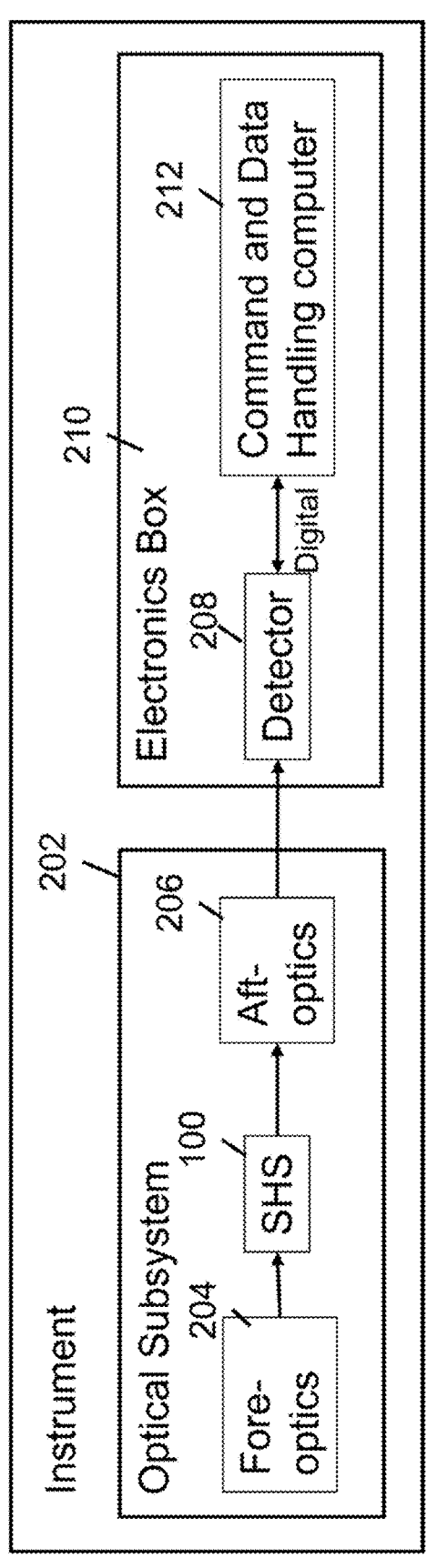
FIG. 2 illustrates a schematic representation of an SHS system in accordance with an embodiment.

Turning to FIG. 2, many embodiments integrate an SHS core 100 into an SHS instrument 200 for performing SHS. In such embodiments, an SHS core 100 is integrated into an optical subsystem 202. Optical subsystems in accordance with many embodiments can include fore optics 204 aligned with the SHS core 100 and configured to direct incoming light into the SHS core 100. Certain embodiments of an instrument 200 include aft optics 206, which are aligned with the SHS core 100, such that light exiting the SHS core 100 passes into the aft optics. Further embodiments include a detector 208 to image a fringe pattern generated by the SHS core 100. In many instances, the detector 208 is in optical alignment with the aft optics 206, such that light passing through the aft optics 206 are directed to and impinge on the detector 208.

In certain embodiments, a detector 208 is housed at least partially within an electronics box 210. In various instances, the electronics box 210 houses one or more electronic components to operate an SHS device or instrument 200, such as to power a detector, execute commands (e.g., to acquire data and/or for how long, direction of data, etc.), communicate acquired data, and/or any other applicable electronic function as described herein. In certain instances, the electronics include a computing device 212 (e.g., command and data handling computer).

Fore Optics

Figure 3:
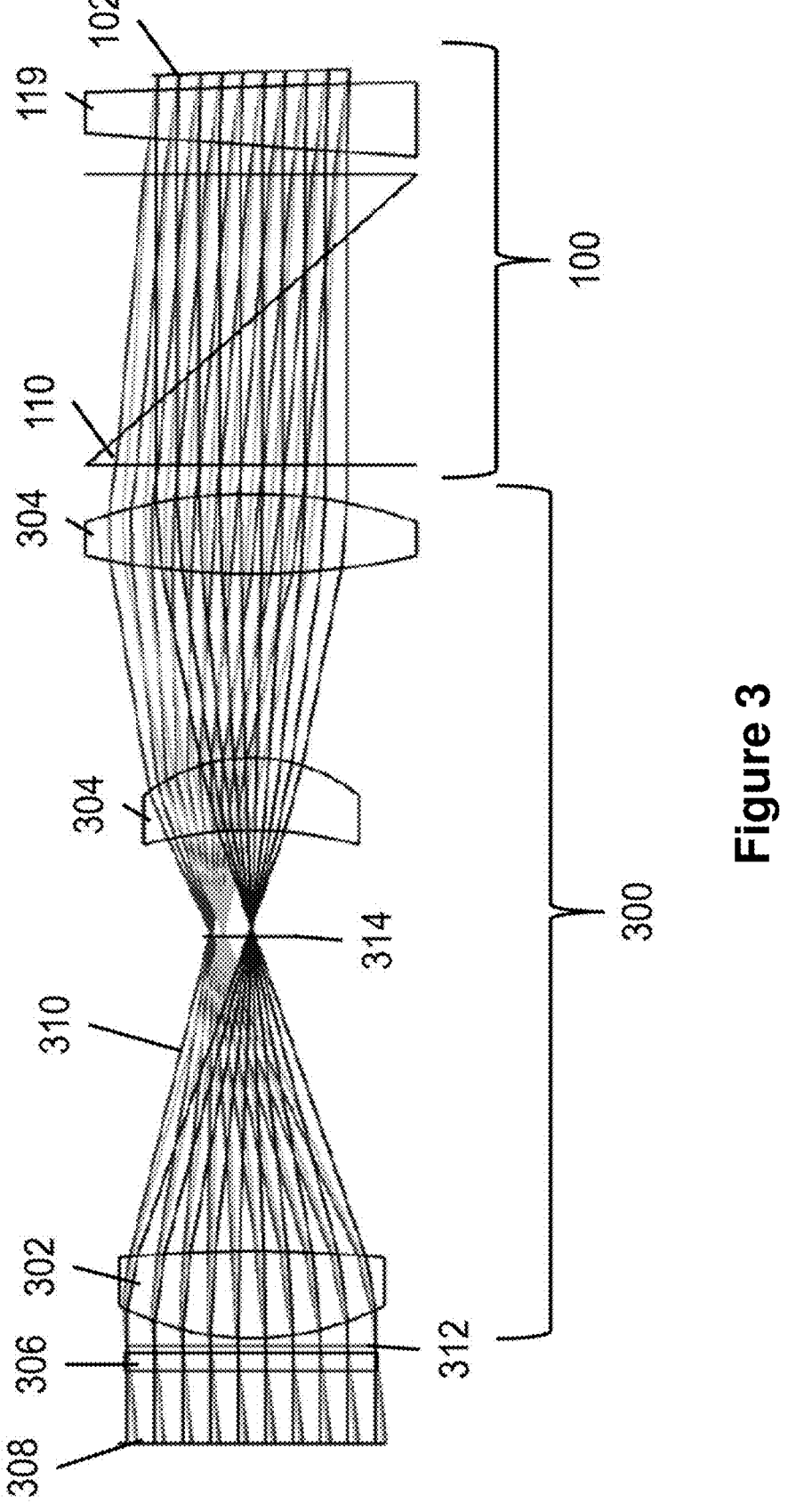
FIG. 3 illustrates a schematic representation of fore optics and a first arm of an SHS core in accordance with an embodiment.

As noted previously, fore optics are configured to direct incoming light into an SHS core. FIG. 3 illustrates an example of fore optics 300 in accordance with many embodiments comprising a light collection lens 302 and a collimating lens 304 aligned with an SHS core 100 and a filter 306. For simplicity only, a first "arm" of the SHS core is illustrated, including a beam splitter 110, a first field widening prism 119, and a first grating 102. In many embodiments, the fore optics 300 and SHS core 100 form an afocal system. As illustrated in the exemplary embodiment of FIG. 3, an object 308 is placed in front of the fore optics. Light 310 from object 308 passes through a filter 306, through a light collection lens 302, then through two collimating lenses 304. While the filter 306 is illustrated in front of the light collection lens 302, one of skill in the art will understand that an appropriate filter may be placed at another location within the fore optics and/or optical system. Additionally, while two collimating lenses 304 are illustrated, some embodiments may have one or more collimating lenses (e.g., one collimating lens, two collimating lenses, three collimating lenses, at least one collimating lenses, at least two collimating lenses, at least three collimating lenses, etc.).

A light collection lens in accordance with many embodiments collects light from a source (e.g., FOV). The light collection lens can direct the collected light into the optical system—e.g., toward the SHS core. Light collection lenses in accordance with embodiments can take the form of a concave lens (e.g., biconcave, plano-concave, convexo-concave), convex (e.g., biconvex, plano-convex, concavo-convex), cylindrical, Fresnel, and/or aspheric. Asphere lenses may be preferred in some embodiments due to being simplistic and still able to produce a small point spread function, thus allowing for a better defined FOV.

In many embodiments, an aperture stop 312 (or area in which area over which light is collected) is controlled at a position in front of the light collection lens. While illustrated at a position after a filter 306, the aperture stop may be located in front of a filter. Additionally, a field stop 314 (or area that limits the angle form which light is collected) in many embodiments may be placed in front of the focal point of the light collection lens 302 (e.g., between the focal point and the light collection lens). In many instances, the light collection lens 302 produces a minimum root mean square (RMS) spot at the plane of the field stop 314 (or field stop plane).

After the field stop 314, light is collimated by the collimating lens(es) 304. In many instances, the collimating lens(es) 304 are optimized to produce an optimized collimated beam at the first grating 102. In many instances, the first grating is set as an exit pupil of the afocal system. In various embodiments, the optimization of the collimating lens(es) 314 considers angular aberrations in both X and Y components of the light. Both X and Y components can be adjusted individually and optimized together, to produce the optimized collimated beam at the first grating 102.

In many embodiments, the first and second grating and the first and second field widening prisms are tilted to a position where a heterodyne wavelength gut ray angle of incidence from the first field widening prism and the first grating and a heterodyne wavelength gut ray angle of incidence from the second field widening prism and the second grating are zero at the detector. Additionally, In various embodiments, the first field widened prism forms a first angle $\alpha$ with an edge of the beam-splitter and an edge of the first field widened prism proximal to the beam-splitter; wherein the second field widened prism forms a second angle $\alpha$ with an edge of the beam-splitter and an edge of the second field widened prism proximal to the beam-splitter, and wherein the first angle $\alpha$ and the second angle $\alpha$ are configured such that the fringe localization pattern is located at the detector. In certain embodiments, the first grating is tilted to form a first angle $\beta$ between the first grating and a path of light directed toward the first grating; wherein the second grating is tilted to form a second angle $\beta$ between the second grating and a path of light directed toward the second grating; and wherein the first angle $\beta$ and the second angle $\beta$ are configured such that the fringe localization pattern is located at the detector.

Aft Optics

Figure 4:
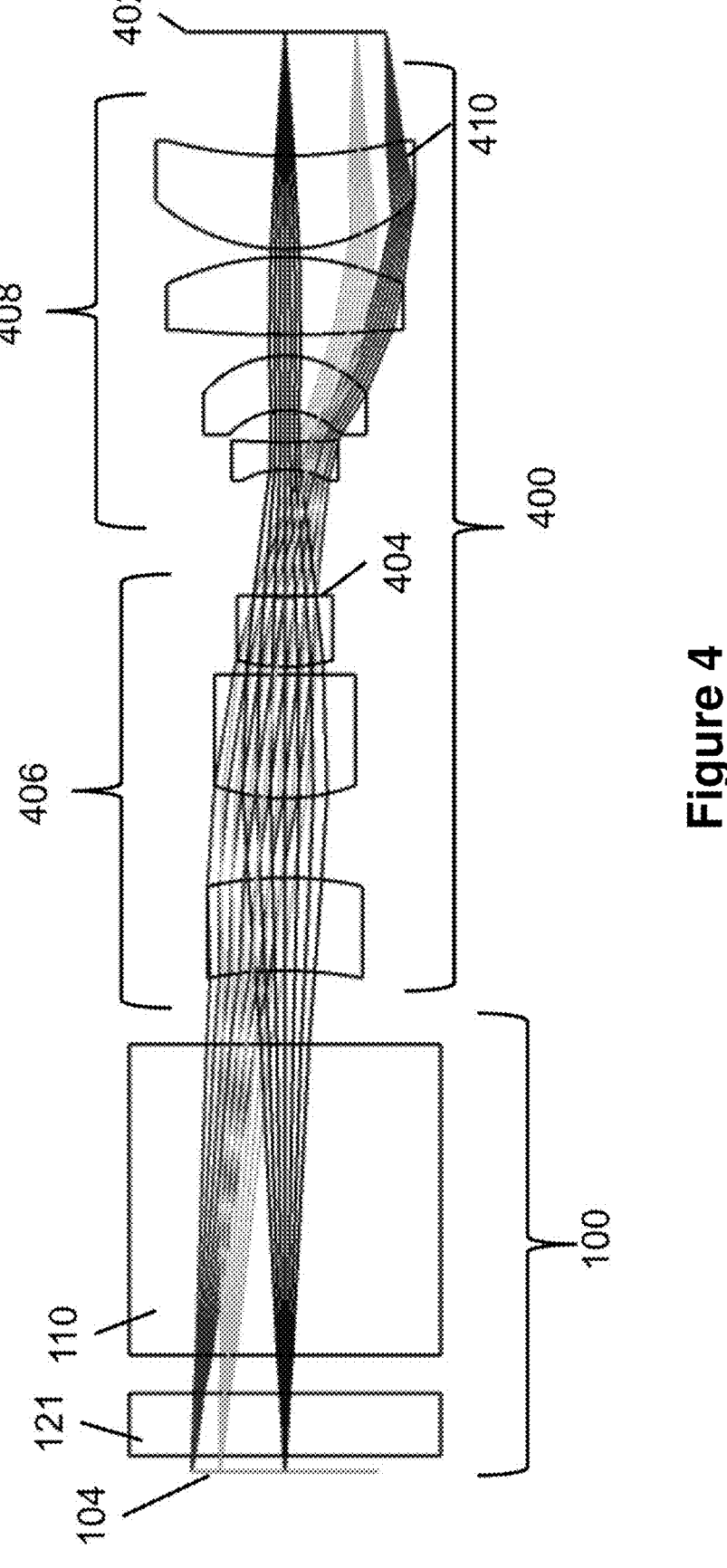
FIG. 4 illustrates a schematic representation of aft optics and a first arm of an SHS core in accordance with an embodiment.

Turning to FIG. 4, an example of aft optics 400, in accordance with many embodiments, are illustrated as aligned to an SHS core 100 and detector 402. For simplicity only, a second "arm" of the SHS core 100 is illustrated, including a beam splitter 110, a second field widening prism 121, and a second grating 104. As noted previously, each arm of an SHS core 100 is symmetrical, thus the positioning of the beam splitter 110, the second field widening prism 121, and the second grating 104 are tantamount to the positions illustrated in FIG. 3. The aft optics 400 of many embodiments form a reimaging system. In such embodiments, an image formed at an exit pupil (e.g., first grating 102) is reimaged onto the detector 402.

In many embodiments, aft optics seek to minimize distortion or aberrations within a fringe pattern. As illustrated in FIG. 4, the aft objects form a double-gauss re-imager or relay to re-image the image to the detector 402. A double-gauss re-imager uses a symmetrical arrangement of lenses to produce high-quality images by minimizing various optical aberrations. In many embodiments, each lens within the aft optics 400 has a diameter sufficient to allow a full filed of view to pass through the aft optics 400 un-vignetted.

In various embodiments, an aperture stop 404 (or area in which area over which light is collected) is controlled at a position between a first set of lenses 406 and a second set of lenses 408. As illustrated, the aperture stop 404 is coincident with a surface of a lens that is proximal to detector 402. A small diameter for aperture stop 404 can be used to minimize aberration at each field point. Additionally, the aft optics 400 can be optimized such that generalized distortion is zero Additionally, optimization can generate a minimum spot size at the detector 402. To complete such optimization, various embodiments determine the extent of transverse ray aberrations in both X- and Y-dimensions, then optimized. In certain embodiments, if X and Y weights are zero then spot size may be based on radial transverse ray aberration.

In various embodiments, the lens most proximal to the detector (e.g., lens 410) makes the image telecentric. The lens architecture of lens 410 may be determined using a chief ray solve set to an angle of zero, such that the chief rays are parallel to an optical axis.

System Components

Figure 5:
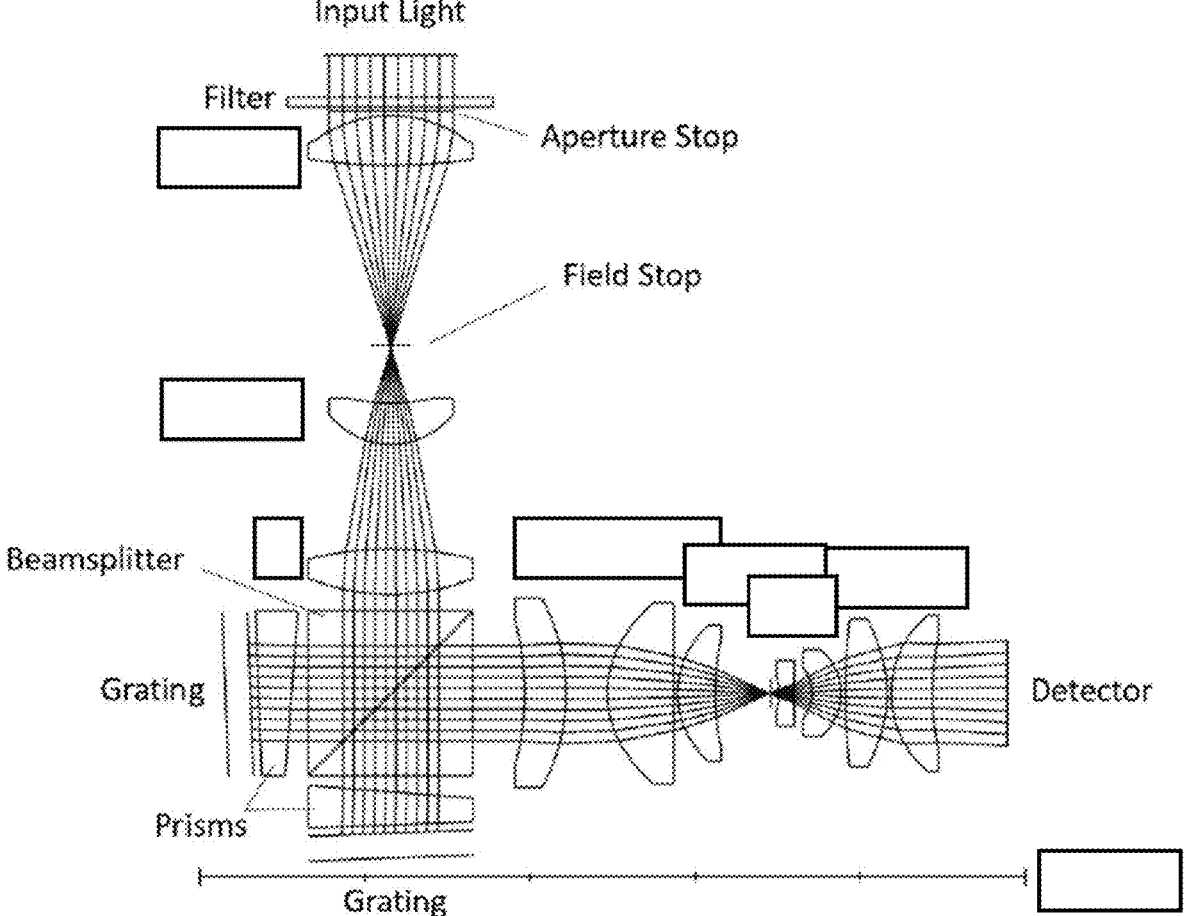
FIG. 5 illustrates a schematic representation of an optical system including fore optics, an SHS core, aft optics, and a detector in accordance with an embodiment.

FIG. 5 illustrates an exemplary assembled optical system with a detector in accordance with various embodiments. As illustrated, the input light (e.g., light from an object) passes through a filter and fore optics. Collimated light generated in the fore optics enters the SHS core comprised of a beam splitter, two prisms, and 2 gratings. Light exiting the SHS core passes through aft optics formed by a series of optical components (e.g., lenses) to impinge on the detector.

In various instances, the optical components (e.g., lenses, prisms, beam splitter, gratings) are constructed of a material that allows for transmission and/or reflection of a desired wavelength of light. Exemplary materials include (but are not limited to) fused silica, quartz, fused quartz, borosilicate glass, aluminosilicate glass, sapphire, calcium fluoride, alkali-aluminosilicate glass, or a glass ceramic. In some instances, all components are constructed of the same material, while other embodiments use two or more materials to construct the various components—e.g., sapphire may be used for some lenses, while fused silica may be used for other lenses. In some embodiments, all optical components are constructed of fused silica. The particular material or materials selected for the optical components can take into consideration various features, such as density (e.g., mass/volume), strength, cost, etc. For example, a device for space launch or hand-held use may benefit from light weight and/or strong materials to survive rigors of launch forces and/or potential trauma from drops, etc. In contrast, stationary or static devices may be constructed of materials that are heavier and/or less robust, as damage is less likely to occur and/or do not have the same pressures from being field-deployed.

In various instances, a detector comprises any applicable sensor to detect light and/or a preferred wavelength. In various instances, the detector is a one-dimensional (1D) or a two-dimensional (2D) array of individual sensors—for example an image detector may be an array of pixels. Detectors can include (but are not limited to) one or more of a photodiode array (PDA), a charge-coupled device (CCD), complementary metal-oxide-semiconductor (CMOS), photoconductive detector, quantum well infrared photodetector (QWIP), indium gallium arsenide (InGaAs) detector, silicon drift detector (SDD), cadmium zinc telluride (CZT) detector, photomultiplier tube (PMT), avalanche photodiodes (APD), golay cells, and photoconductive antennas.

In various instances, the optical system is housed within a frame and barrel assembly. A frame and barrel assembly may be constructed by various applicable and/or known means, including (but not limited to) three-dimensional (3D) printing and/or precision machining. Frame and barrel assemblies of various embodiments are designed to hold various components (e.g., lens(es), filter(s), grating(s), detector(s), etc.). Various embodiments house the optical system and detector within a housing, such as a barrel and frame assembly. Such housings can prevent off target, environmental, or other unwanted light sources from entering the optics and impinging upon the detector. In certain instances, the housing further encompasses the associated electronics or electronics box (e.g., FIG. 2, 210) (e.g., computational device) and power control equipment (e.g., one or more batteries, resistors, etc. to power the computational device and/or detector.)

Computing devices of the system can include one or more memories (e.g., volatile memory, non-volatile memory, etc.). Certain pieces of information or data, (e.g., fringe patterns, resultant analyses, etc.) or instructions for execution (e.g., analysis, etc.) may be comprised in one or more of the volatile and/or non-volatile memory. Further computing devices can include a processor to execute such functions or instructions for execution. Computing devices can further include input and/or output devices or ports to connect to peripheral devices (e.g., detector), communication equipment, and/or any other applicable and appropriate device. Such communication can be to disseminate data, images, results, etc., and/or to receive input from another device, such as user inputs, software updates, firmware updates, etc. The electronic connection between the detector and the computation device can be wired, wireless (e.g., Bluetooth, wi-fi, radio frequency, infrared, etc.), or both wired and wireless to provide redundancy and/or if atmospheric or environmental conditions interfere with, disrupt, or destroy a communication system.

Based on the characteristics described above regarding the fore optics and aft optics, many embodiments are capable of miniaturizing an SHS instrument. In many instances, the optical system (e.g., SHS core, fore optics, aft optics, and detector) may have a dimensions less than or equal to about 30 cm×30 cm×30 cm; or less than or equal to about 25 cm×25 cm×25 cm; or less than or equal to about 20 cm×20 cm×20 cm; or less than or equal to about 15 cm×15 cm×15 cm; or less than or equal to about 10×10×10 cm. The foregoing dimensions are not meant to indicate a cubical shape to any arrangement and that one or more dimension may be smaller than one of the dimensions: for example, "less than or equal to about 15 cm×15 cm×15 cm" includes an arrangement having dimensions of 15 cm×15 cm×10 cm, 15 cm×10 cm×15 cm, etc.). Additionally, the combined mass of the optical components (e.g., SHS core, fore optics, and aft optics) may be less than about 2000 g, less than about 1500 g, less than about 1000 g, or less than about 500 g. In some instances, the entire instrument (e.g., optical subsystem and electronics box as illustrated in FIG. 2) may have a combined mass of less than about 5000 g, less than about 4000 g, less than about 3000 g, less than about 2500 g, less than about 2000 g, less than about 1500 g, or less than about 1000 g.

Additional embodiments can include components to provide movement, gather power, and/or direct position of a system. For example, some embodiments may include wheels, tracks, legs, wings, propeller (or rotor), or other mechanism that may allow a device to move on a planetary surface and/or within a planetary atmosphere (e.g., moon, Mars, etc.). Certain embodiments may include a power generator (e.g., engine, solar panels, etc.) to allow for additional power generation for mobility and/or operation. Additionally, as discussed above, communication equipment may be included (e.g., antennas, dishes, etc.) to send and/or receive communications or commands to a remote device, server, station, and/or user. To aim or direct input, some embodiments may utilize a gimbal, arm, and/or other mechanical platform to point an input point and/or change distance to an object. External lighting may also be included, such as a light, laser, or other source to illuminate a sample as desired.

SHS System Design

Various embodiments are directed to designing and/or constructing and SHS system, such as those described herein. Some design processes include optimization of optical components to design optical components and their placement based on size, curvature, construction material, and/or any other input to assist with modeling. Some instances may set certain requirements for structural integrity (e.g., thickness of optical components) in order to survive drops, falls, rocket launches, and other stressors on a device. Optimization may include modeling light paths using a ray tracing program to model the paths of light.

Many instances design an SHS core (e.g., gratings, beam splitter, optionally a prism). In various instances, the process identifies and angle $\alpha$ for a field widening prism, such as described above. This SHS core can be optimized by tilting the first grating, the second grating, the first field widening prism, and the second field widening prism to a position where a heterodyne wavelength gut ray angle of incidence from the first field widening prism and the first grating and a heterodyne wavelength gut ray angle of incidence from the second field widening prism and the second grating are zero at a detector.

In various instances, the fore optics are optimized as an afocal system including the first arm of the SHS core, such as aby optimizing the light collection lens(es) to produce a minimum RMS spot size at a filed stop plane and optimizing the collimating lens(es) to produce an optimized collimated beam at the first grating. In some instances, optimization includes locating the aperture stop in front of a light collection lens (e.g., prior to incoming light transmitting through the light collection lens). If using a filter, the aperture stop may be between the filter and the light collection lens. Certain embodiments also place an exit pupil at the grating within the first arm of the SHS core.

In some instances aft optics are designed as a reimaging system. In many instances, the aft optics are designed to have a diameter that is sufficient to allow a full field of view to pass through the aft optics un-vignetted. In many embodiments, the design includes optimizing general distortion to zero and/or minimizing a spot size at a detector. Optimizing general distortion can include computing transverse ray aberrations in image space in a diffraction plane and perpendicular to a diffraction plane—transverse ray aberrations can be optimized in both planes (e.g., X-plane and Y-plane) together. In many instances, the aft optics are designed and/or optimized to minimize distortion at a detector. Minimizing this distortion can include optimizing the aft optics such that chief rays passing through a final power element to the detector are parallel to an optical axis of the aft optics.

Once optical components (as described above) are designed, they may be machined, printed, or otherwise constructed. To hold the optical components in their proper position, many instances place these components in a housing, such as a frame and barrel assembly as described above. As noted, the housing (e.g., frame and barrel assembly) can be 3D printed, machined, etc. as described above.

Uses of Field-Deployable SHS Devices

It should be noted that there are many different types of spectroscopy, and various embodiments can be used in many types of spectroscopy for chemical analysis, including atomic spectroscopy, ultraviolet, and visible spectroscopy, infrared spectroscopy, fluorescence spectroscopy, and Raman spectroscopy. Various embodiments can be deployed for chemical analysis, while additional embodiments can be utilized for diagnostic screening or other implementations, where spectroscopy may suitable or for analysis or identification of underlying components or specimens.

Figure 6A:
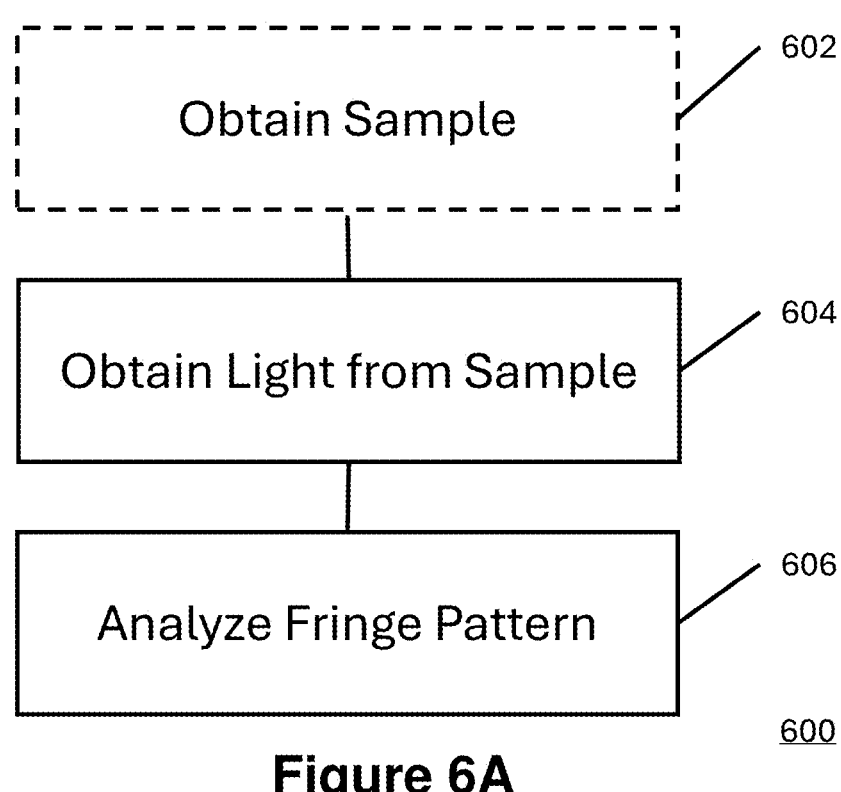
FIG. 6A illustrates a method for using a field-deployable SHS system in accordance with an embodiment.

Turning to FIG. 6A, a method 600 of using a field-deployable SHS device in accordance with many embodiments is illustrated. At 600, certain embodiments obtain a sample—such as for in vitro testing. However, many instances are capable of performing analysis in situ—e.g., without collecting, moving, or otherwise obtaining a sample from its position. In various embodiments, the sample is organic, inorganic, biologic, agricultural, environmental, and/or any other sample of interest. Some embodiments obtain a biological sample, such as from a mammal, an insect, a virus, a bird, a reptile, an amphibian, a bacterium, a protist, a fish, an insect, a crustacean, a plant, an archaea, a fungus, a protozoan, an alga, and/or other biological form. Samples may be organismal (e.g., entire organism) or a portion therefrom—e.g., saliva, mucus, blood, urine, fecal, skin, milk, egg, tissue, breath (e.g., exhaled breath), or other biological sample. Certain embodiments obtain an environmental sample, such as from a body of water (e.g., lake, river, stream, etc.), soil sample, rock sample, air sample, and/or another environmental sample. Various embodiments obtain samples from areas of human use, such as doorknobs, toilet handles, toilet seats, airplane seats (e.g., armrests, tray tables, etc.), surgical suites, hospital rooms, and/or any other high-touch area. Further embodiments obtain agricultural samples, such as leaves, sepals, petals, branches, canopy, or other type of agricultural sample, where water status (e.g., draught stress), pest or disease infection, or any other relevant feature can be monitored. Some embodiments may sample chemical compounds to test for purity, contamination, etc. Chemical compounds may include pharmaceuticals (e.g., pharmaceutical compounds or compositions, including an active ingredient and/or a formulation). Additional embodiment can test for the presence of and/or adulteration of a narcotic or other illicit drug.

Figure 6B:
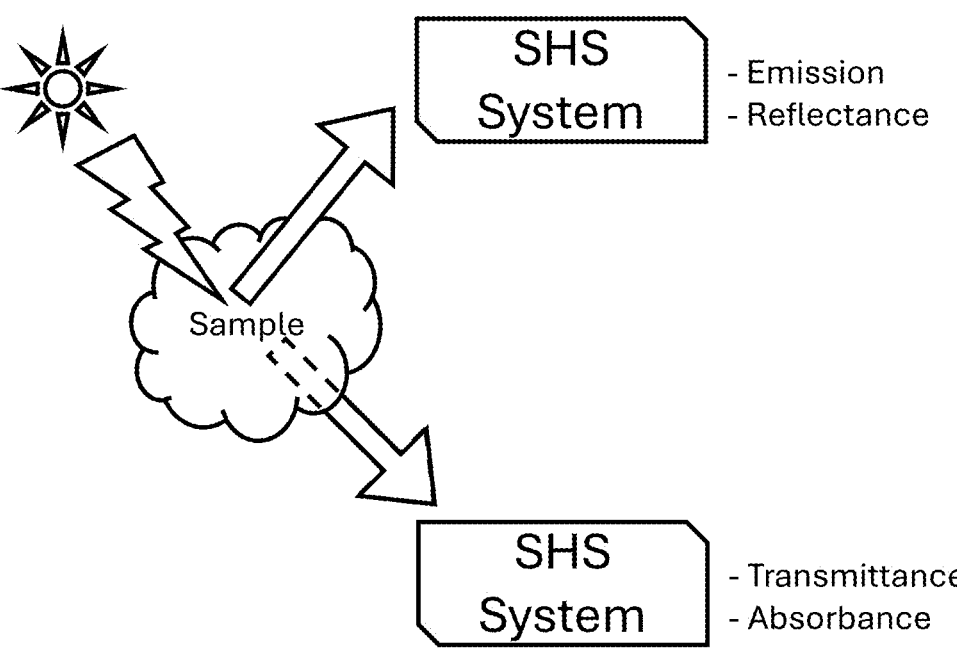
FIG. 6B illustrates an schematic of illuminating a sample in accordance with an embodiment.

At 604, many embodiments obtain light from the sample. Many embodiments may begin process 600 with this item, such as when a sample is in situ and does not require collection or obtention, such as described above. Depending on type of sample, the obtained light can take the form of emission (e.g., light produced by the sample), reflectance, transmittance, and/or absorbance. Emittance can take the form of light produced by a sample and/or fluorescence, where a sample produces a photon upon excitation by an external source. FIG. 6B illustrates possible placement of an SHS system as described herein to identify one or more forms of light collection. For example, for emission or reflectance, a system may be placed on the same side of the sample as a light source, while transmittance and absorbance may place the SHS system on the opposite side of the sample as a light source. When illuminating a sample (e.g., for transmittance, fluorescence, absorbance, reflectance, etc.), the light source may be ambient (e.g., the sun or other star), while certain embodiments illuminate the sample artificially, such as with a particular light source or wavelength of light—e.g., for fluorescence, where a particular wavelength may be used as the excitation wavelength. The obtained emission travels into a field-deployable SHS device as incoming light. As noted elsewhere herein, incoming light travels through fore optics into an SHS, then aft optics to a detector, where a fringe pattern is imaged.

At 606, the fringe pattern is analyzed for one or more components in the sample. Such analysis may include comparisons to a database of standards. For example, the database could identify various chemical agents or compounds to identify one or more chemicals present within the sample, while other databases may provide spectra for microbes or viruses that could be present within a sample. As such, various embodiments could be deployed as field diagnostic devices for monitoring epidemics, pandemics, or other biological outbreaks that occur. While some embodiments can be deployed to check for purity or contamination within a batch of pharmaceuticals. Further embodiments can be deployed for exploration and analysis of soil, rock, or other environmental samples on other planetary bodies, such as Mars, Venus, the moon, or another planetary body. Various embodiments obtain databases from publicly available sources, while other embodiments generate novel databases over time.

It should be noted that the steps of method 600 may be performed in a different order or may be omitted depending on specific use of method 600. For example, certain embodiments may obtain a light emission 604 from an in situ sample, such as tree or field canopy or rock formation, thus omitting obtaining a sample 602. One of skill in the art will appreciate the ability to manipulate or augment certain features of method 600 to be suitable for a particular purpose.

For purposes of completeness, various aspects of the present disclosure are set out in the following numbered clauses Aspect 1. A device for performing spectroscopy, comprising:

a spatial heterodyne spectrometer (SHS) core comprising a beam-splitter, a first grating, and a second grating; wherein the beam-splitter, the first grating, and the second grating form a 90° angle with the beam-splitter at the vertex of the angle; and wherein the beam-splitter is configured to split the incoming light to the first grating and the second grating;

fore-optics aligned with the SHS core and configured to direct incoming light into the SHS core;

aft-optics aligned with the SHS core, such that light exiting the SHS core passes into the aft optics; and a detector to image a fringe pattern generated by the SHS core.

Aspect 2. The device for performing spectroscopy of Aspect 1, wherein the SHS core further comprises a first field widening prism and a second field widening prism, wherein the first field widening prism is located between the beam splitter and the first grating and the second field widening prism is located between the beam splitter and the second grating.

Aspect 3. The device for performing spectroscopy of Aspect 2, wherein the first and second field widening prisms possess an angle for field widening based on a desired heterodyne wavelength, index of refraction of a construction material, and frequency of the first and second gratings.

Aspect 4. The device for performing spectroscopy of Aspect 2 or 3, wherein the first and second grating and the first and second field widening prisms are tilted to a position where a heterodyne wavelength gut ray angle of incidence from the first field widening prism and the first grating and a heterodyne wavelength gut ray angle of incidence from the second field widening prism and the second grating are zero at the detector.

Aspect 5. The device for performing spectroscopy of any one of Aspects 2-4, wherein the first field widened prism forms a first angle α with an edge of the beam-splitter and an edge of the first field widened prism proximal to the beam-splitter; wherein the second field widened prism forms a second angle α with an edge of the beam-splitter and an edge of the second field widened prism proximal to the beam-splitter, and wherein the first angle α and the second angle α are configured such that the fringe localization pattern is located at the detector.

Aspect 6. The device for performing spectroscopy of any one of Aspects 2-5, wherein the first grating is tilted to form a first angle β between the first grating and a path of light directed toward the first grating; wherein the second grating is tilted to form a second angle β between the second grating and a path of light directed toward the second grating; and wherein the first angle β and the second angle β are configured such that the fringe localization pattern is located at the detector.

Aspect 7. The device for performing spectroscopy of any one of Aspects 2-6, further comprising a filter located prior to the fore-optics such that incoming light passes through the filter into the fore-optics.

Aspect 8. The device for performing spectroscopy of Aspect 7, wherein the filter is selected from a long pass filter, a short pass filter, and a band pass filter.

Aspect 9. The device for performing spectroscopy of any one of Aspects 1-8, wherein the area over which light is collected is controlled at a position before the first power element in the fore-optics.

Aspect 10. The device for performing spectroscopy of any one of Aspects 1-9, wherein the fore-optics, the beam-splitter, and the first grating form an afocal system.

Aspect 11. The device for performing spectroscopy of Aspect 10, wherein an exit pupil of the afocal system is located at the first grating.

Aspect 12. The device for performing spectroscopy of Aspect 11, wherein the detector is positioned so that the image at the exit pupil of the afocal system is re-imaged on to the detector.

Aspect 13. The device for performing spectroscopy of any one of Aspects 2-12, wherein the fore-optics comprises a light collection lens and a collimating lens.

Aspect 14. The device for performing spectroscopy of Aspect 13, wherein the collimating lens is at least two lenses.

Aspect 15. The device for performing spectroscopy of Aspect 14, wherein the light collection lens produces a minimum root mean square spot size at a field stop plane.

Aspect 16. The device for performing spectroscopy of Aspect 14 or 15, wherein the light collection lens is an asphere lens.

Aspect 17. The device for performing spectroscopy of any one of Aspects 1-16, wherein the collimating lens forms an optimized collimated beam at the grating.

Aspect 18. The device for performing spectroscopy of any one of Aspects 1-17, wherein the aft-optics, the beam-splitter, and the second grating form a re-imaging system.

Aspect 19. The device for performing spectroscopy of Aspect 18, wherein the re-imaging system is a double-gauss re-imager.

Aspect 20. The device for performing spectroscopy of any one of Aspects 1-19, wherein each optical component in the aft-optics has a diameter sufficient to allow a full field of view to pass through the aft-optics un-vignetted.

Aspect 21. The device for performing spectroscopy of any one of Aspects 1-20, further comprising a frame and barrel assembly housing the detector, the SHS core, the fore optics, and the aft optics.

Aspect 22. The device for performing spectroscopy of Aspect 21, wherein the frame and barrel assembly is 3D printed.

Aspect 23. The device for performing spectroscopy of any one of Aspects 1-22, wherein the SHS core, the fore optics, and the aft optics have a combined mass of less than 1000 grams.

Aspect 24. The device for performing spectroscopy of any one of Aspects 1-22, wherein the device for performing spectroscopy has a mass of less than 2000 grams.

Aspect 25. The device for performing spectroscopy of any one of Aspects 1-24, wherein the SHS core, the fore optics, the aft optics, and the detector have combined dimensions of less than or equal to 15 cm×15 cm×15 cm.

Aspect 26. The device for performing spectroscopy of any one of Aspects 1-25, wherein each optical component is constructed of one or more of fused silica, quartz, fused quartz, borosilicate glass, aluminosilicate glass, sapphire, calcium fluoride, alkali-aluminosilicate glass, or a glass ceramic.

Aspect 27. The device for performing spectroscopy of any one of Aspects 1-26, wherein all optical components are constructed of the same material.

Aspect 28. The device for performing spectroscopy of any one of Aspects 1-27, wherein all optical components are constructed of fused silica.

Aspect 29. A method of using a spectroscopy device of any one of Aspects 1-28, comprising:

obtaining a light from a sample, wherein the light passes through input optics into an SHS instrument to image a fringe pattern on a detector; and analyzing the fringe pattern to identify a component within the sample.

Aspect 30. The method of Aspect 29, wherein the sample is a biological sample.

Aspect 31. The method of Aspect 30, wherein the biological sample is selected from at least one of saliva, mucus, blood, urine, fecal, skin, milk, egg, and tissue.

Aspect 32. The method of Aspect 30 or 31, wherein the biological sample is in situ or in vitro.

Aspect 33. The method of Aspect 29, wherein the sample is selected from a mammal, an insect, a virus, a bird, a reptile, an amphibian, a bacterium, a protist, a fish, an insect, a crustacean, a plant, an archaea, a fungus, a protozoan, and an alga.

Aspect 34. The method of Aspect 29, wherein the sample is an agricultural sample.

Aspect 35. The method of Aspect 29, wherein the sample is an environmental sample selected from a water sample, soil sample, rock sample, air sample.

Aspect 36. The method of Aspect 29, wherein the sample is a pharmaceutical compound or composition.

Aspect 37. The method of Aspect 29, wherein the sample is a narcotic or an illicit drug.

Aspect 38. The method of any one of Aspects 29-37, further comprising illuminating the sample.

Aspect 39. The method of any one of Aspects 29-38, wherein the light from the sample is selected from emission, reflection, absorption, fluorescence, and Rahman.

Aspect 40. A method for making a spectroscopy device, comprising:

identifying an angle α for a field widening prism based on a desired heterodyne wavelength, index of refraction of a construction material, and frequency of a grating;

optimizing fore-optics as an afocal system, wherein the afocal system comprises a light collection lens, a collimating lens, a beam splitter, a first field widening prism, and a first grating;

optimizing aft optics as a re-imaging system, wherein the re-imaging system comprises at least one lens, the beam splitter, a second field widening prism, and a second grating; and optimizing a detector position, such that an image at a pupil of the fore-optics is re-imaged on the detector.

Aspect 41. The method of Aspect 40, further comprising optimizing the system by tilting the first grating, the second grating, the first field widening prism, and the second field widening prism to a position where a heterodyne wavelength gut ray angle of incidence from the first field widening prism and the first grating and a heterodyne wavelength gut ray angle of incidence from the second field widening prism and the second grating are zero at the detector.

Aspect 42. The method of Aspect 40 or 41, wherein optimizing the fore optics comprises:

optimizing the light collection lens to produce a minimum root mean square spot size at a field stop plane; and optimizing the collimating lens to form an optimized collimated beam at the first grating.

Aspect 43. The method of any one of Aspects 40-42, further comprising a filter located forward of the fore optics, such that incoming light passes through the filter then into the fore optics; and wherein optimizing the fore optics comprises:

locating an aperture stop between the filter and the fore optics; and locating an exit pupil of the fore optics to be located at the grating.

Aspect 44. The method of any one of Aspects 40-43, wherein optimizing the aft optics comprises altering a diameter of each optical component within the aft optics sufficient to allow a full field of view to pass through the aft-optics un-vignetted.

Aspect 45. The method of any one of Aspects 40-44, wherein optimizing the aft optics comprises:

optimizing generalized distortion to zero; and minimizing a spot size at the detector.

Aspect 46. The method of Aspect 45, wherein optimizing generalized distortion comprises computing transverse ray aberrations in image space in a diffraction plane and perpendicular to the diffraction plane and optimizing both the transverse ray aberrations in both planes together.

Aspect 47. The method of any one of Aspects 40-46, wherein optimizing the aft optics comprises minimizing distortion on the detector.

Aspect 48. The method of Aspect 47, wherein minimizing distortion comprises optimizing the aft optics such that chief rays passing through a final power element to the detector are parallel to an optical axis of the aft optics.

Aspect 49. The method of any one of Aspects 40-48, further comprising housing the spectroscopy device into a frame and barrel assembly.

Aspect 50. The method of Aspect 49, further comprising 3D printing the frame and barrel assembly.

Aspect 51. The method of any one of Aspects 40-50, wherein the SHS, fore optics, and aft optics have a combined mass of less than 1000 grams.

Aspect 52. The method of any one of Aspects 40-50, wherein the device for performing spectroscopy has a mass of less than 2000 grams.

Aspect 53. The method of any one of Aspects 40-52, wherein the SHS, the fore optics, the aft optics, and the detector have combined dimensions of less than or equal to 15 cm×15 cm×15 cm.

EXEMPLARY EMBODIMENTS

Although the following embodiments provide details on certain embodiments of the inventions, it should be understood that these are only exemplary in nature and are not intended to limit the scope of the invention.

Example 1: Modeling Instrument Performance

Figure 7:
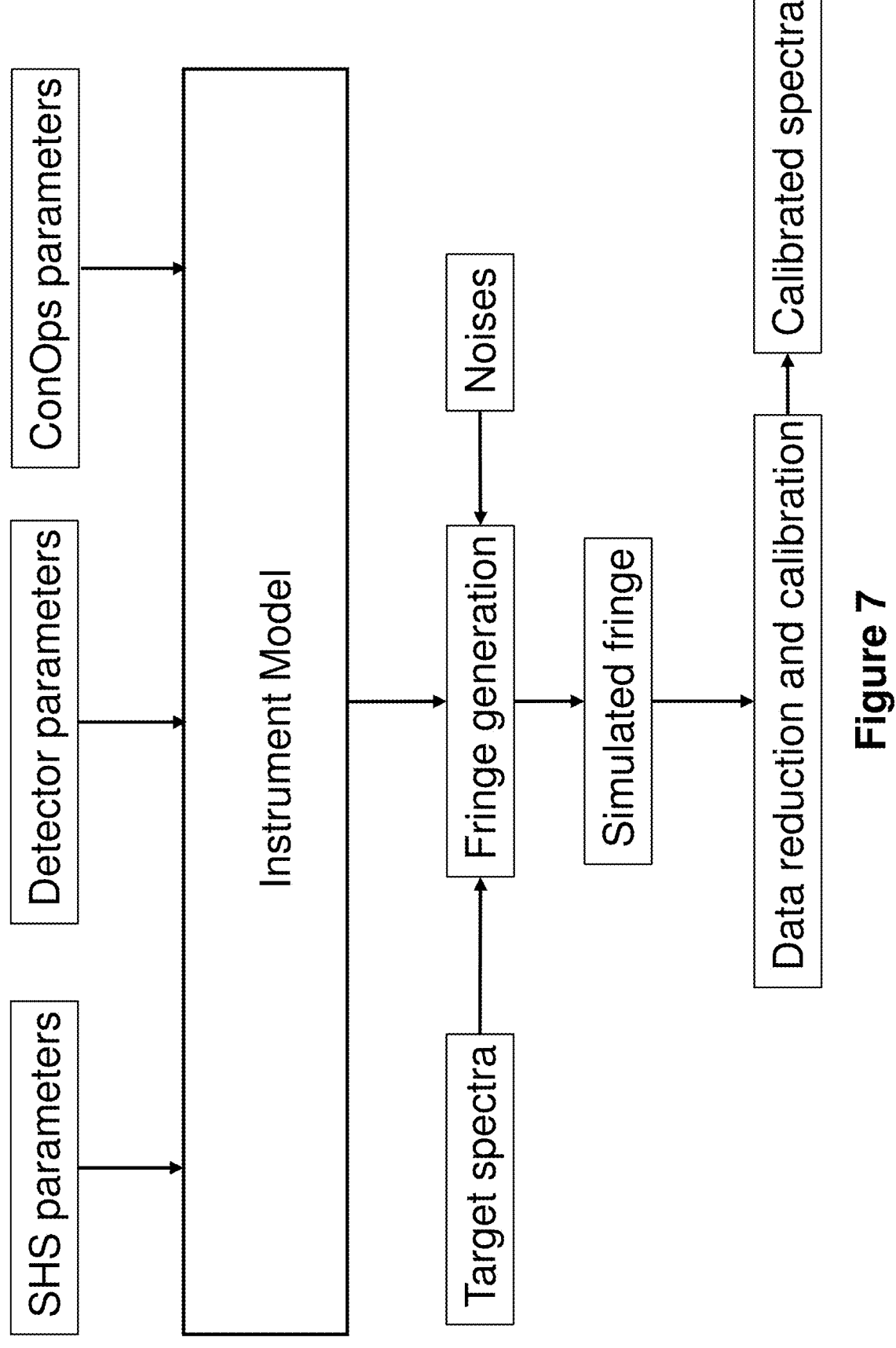
FIG. 7 illustrates a process for the instrument performance model in accordance with an embodiment.

Many embodiments provide end-to-end instrument performance models with capability to simulate fringes, add noises, and perform data reduction. This example describes a walkthrough of modeling performance, as illustrated in FIG. 7. The model accepted inputs for the spectrometers such as SHS optics parameters, detector specifications, and concept of operations (ConOps) parameters. The model simulated the fringe pattern using instrument parameters, observation target spectra, noises, etc. Data reduction and calibration code performed fast Fourier transform (FFT) using the simulated fringe pattern to reduce the data into a calibrated spectra.

Figure 8A:
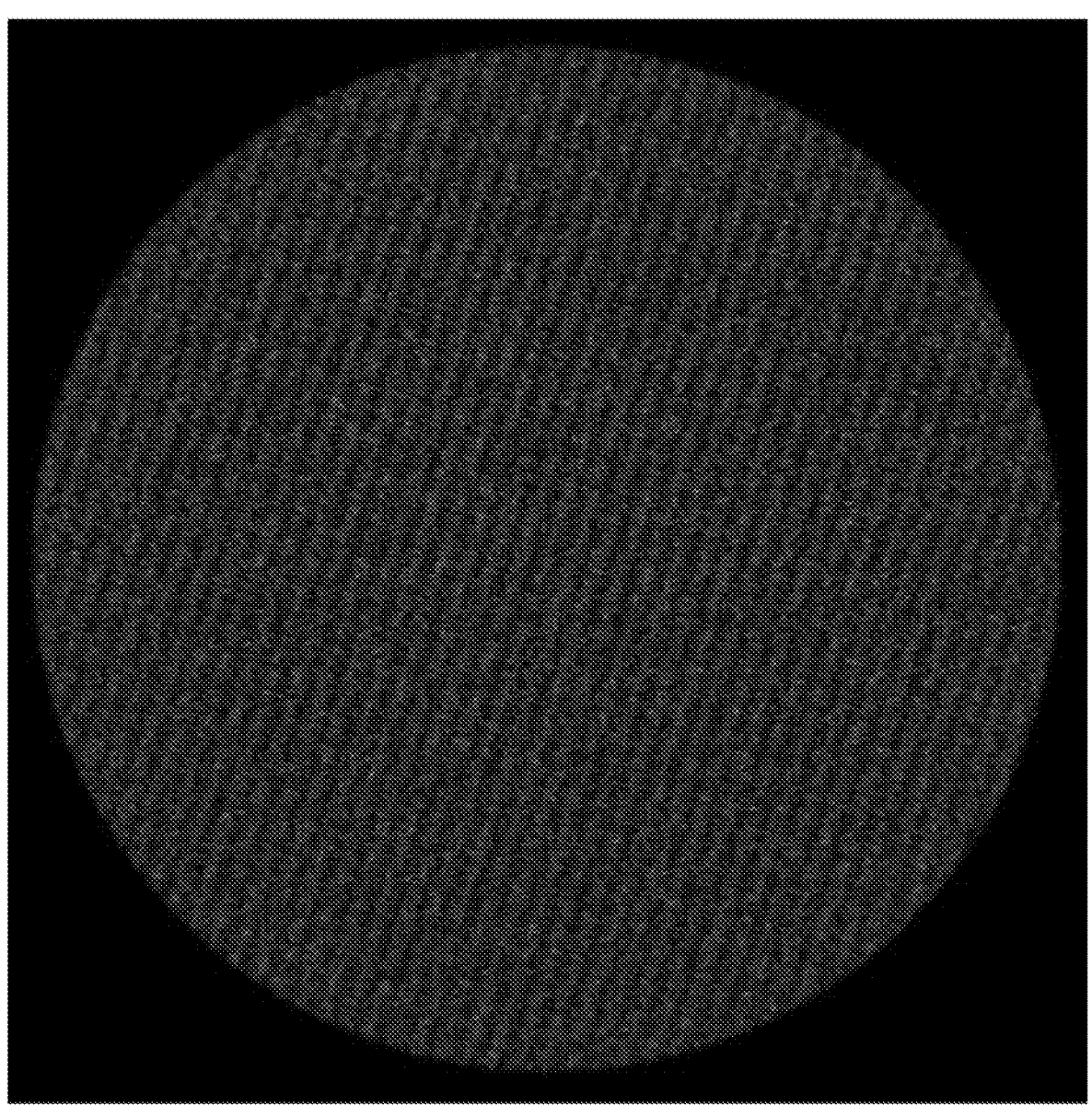
FIG. 8A illustrates an exemplary interferogram as modeled to be generated by an embodiments described herein.
Figure 8B:
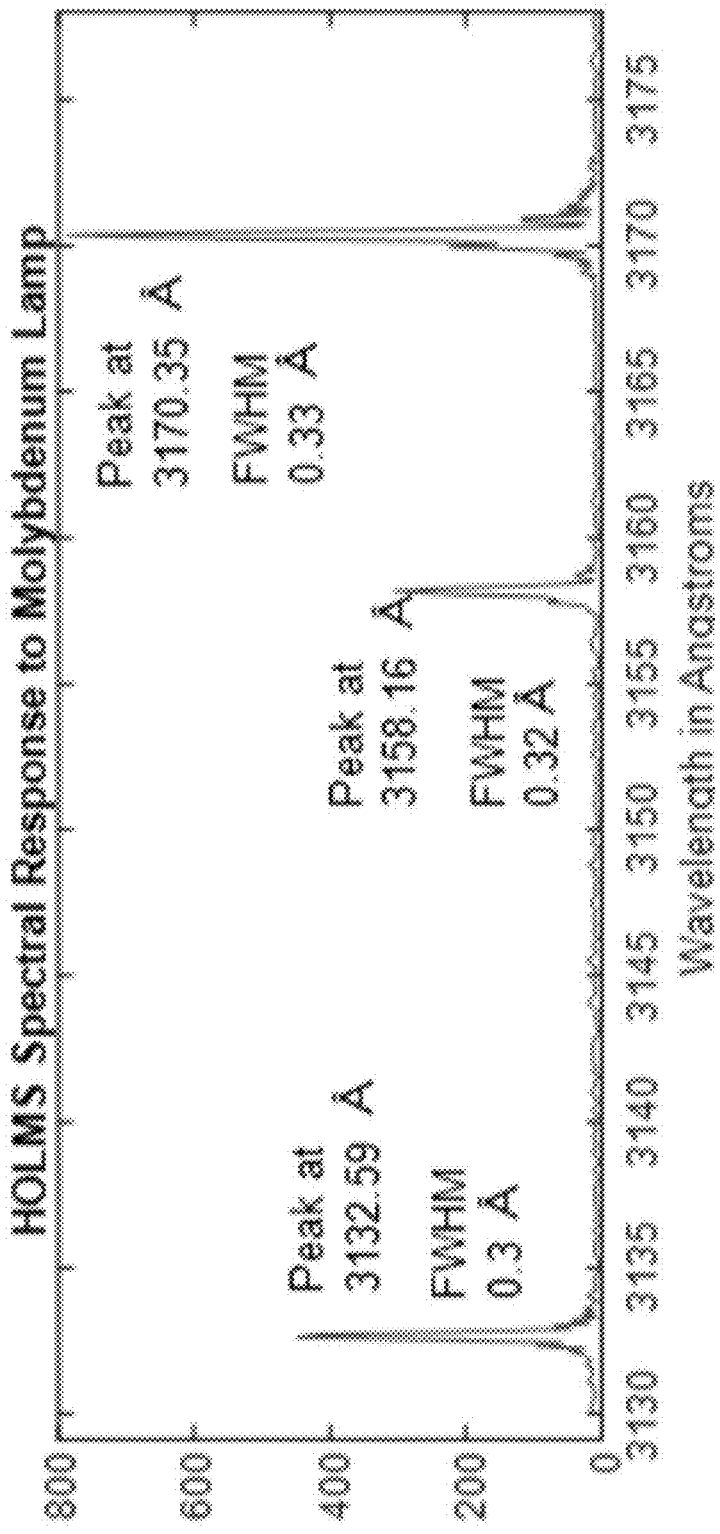
FIG. 8B illustrates a spectrogram as identified using the interferogram of FIG. 8A, in accordance with various embodiments.

In this example, an instrument in accordance with the description herein was modeled for its ability to detect molybdenum using the model of FIG. 7. For this model, wavelengths for a molybdenum spectrum were input one at a time, including wavelengths of 0.311212 μm, 0.313259 μm, 0.315816 μm, 0.317035 μm, and 0.319397 μm. Based on this spectrum, the interferogram of FIG. 8A was generated. The modeled interferogram data was reduced into a calibrated spectrum as illustrated in FIG. 8B.

Figure 9B:
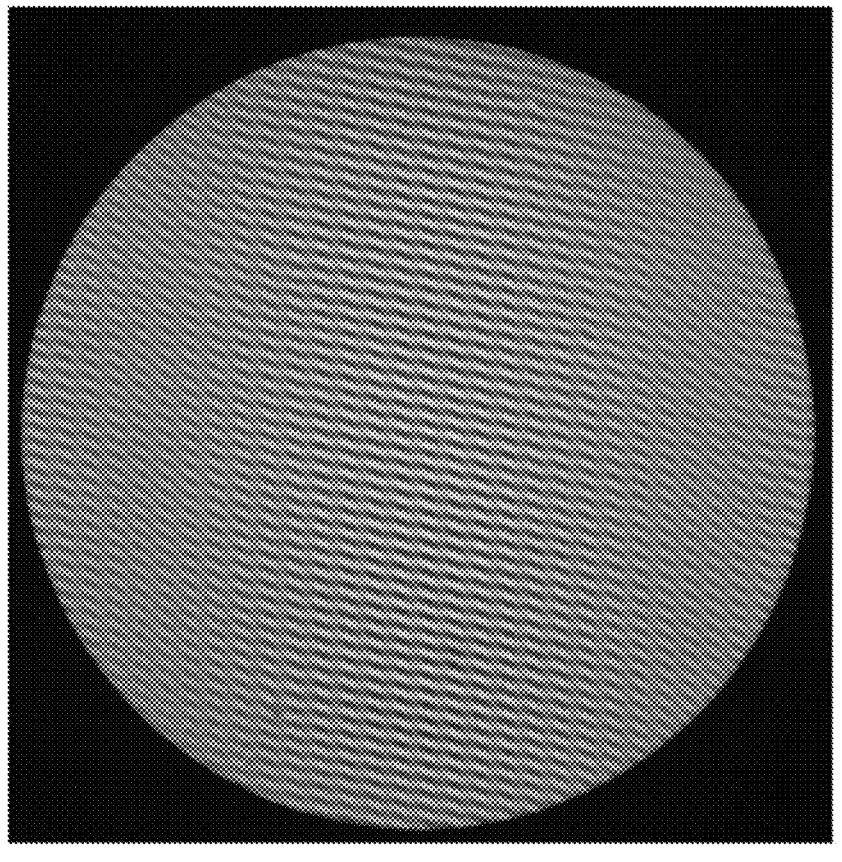
FIGS. 9A and 9B illustrate interferograms measured via miniature SHS systems, in accordance with various embodiments.
Figure 9A:
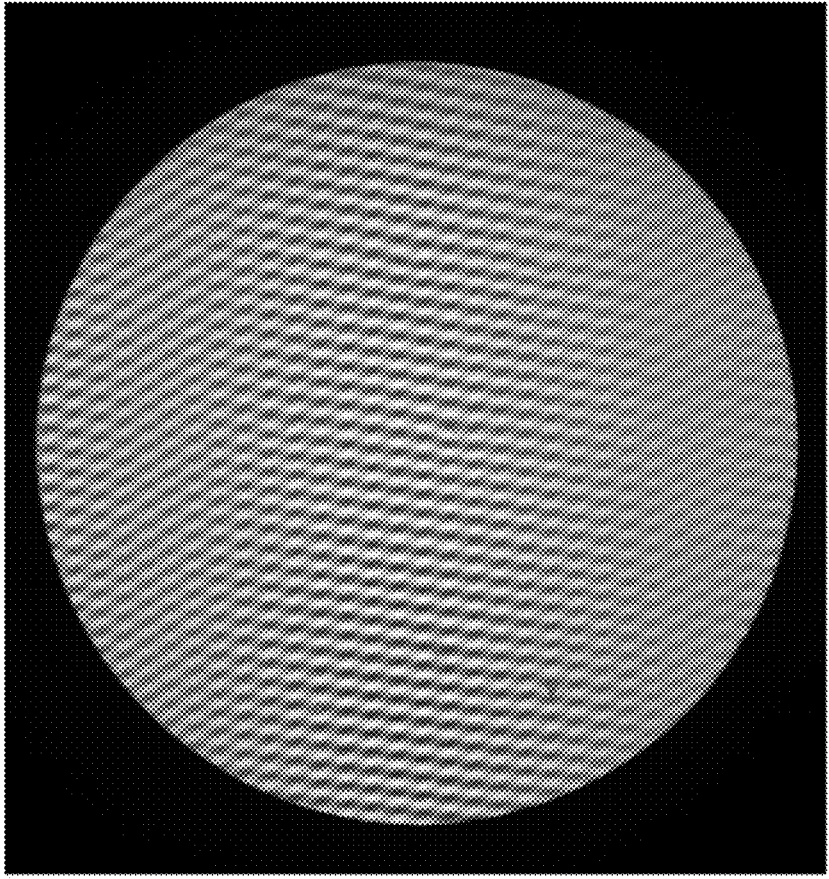
Figure 10A:
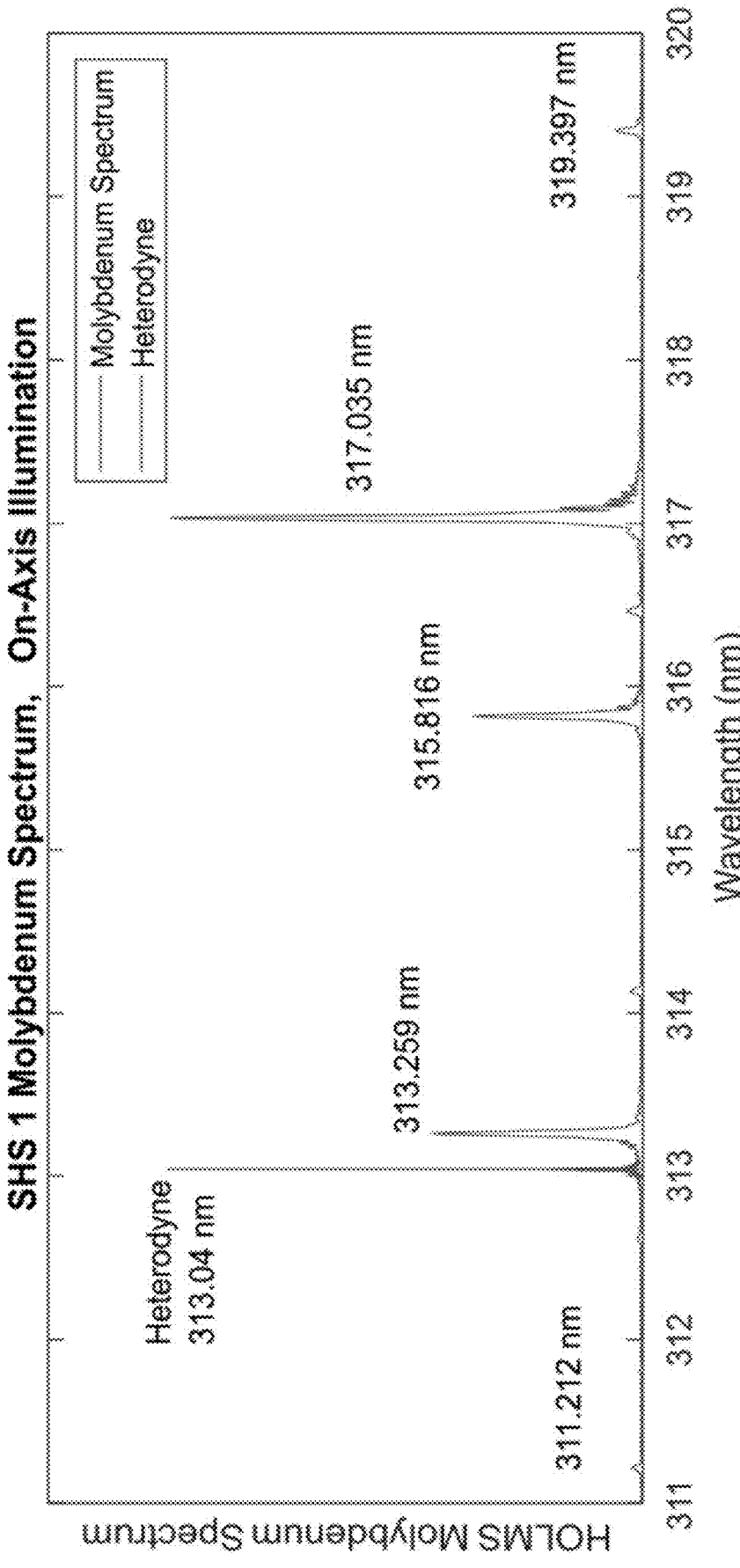
FIGS. 10A and 10B illustrate spectrograms generated from the interferograms of FIGS. 9A and 9B, in accordance with various embodiments.
Figure 10B:
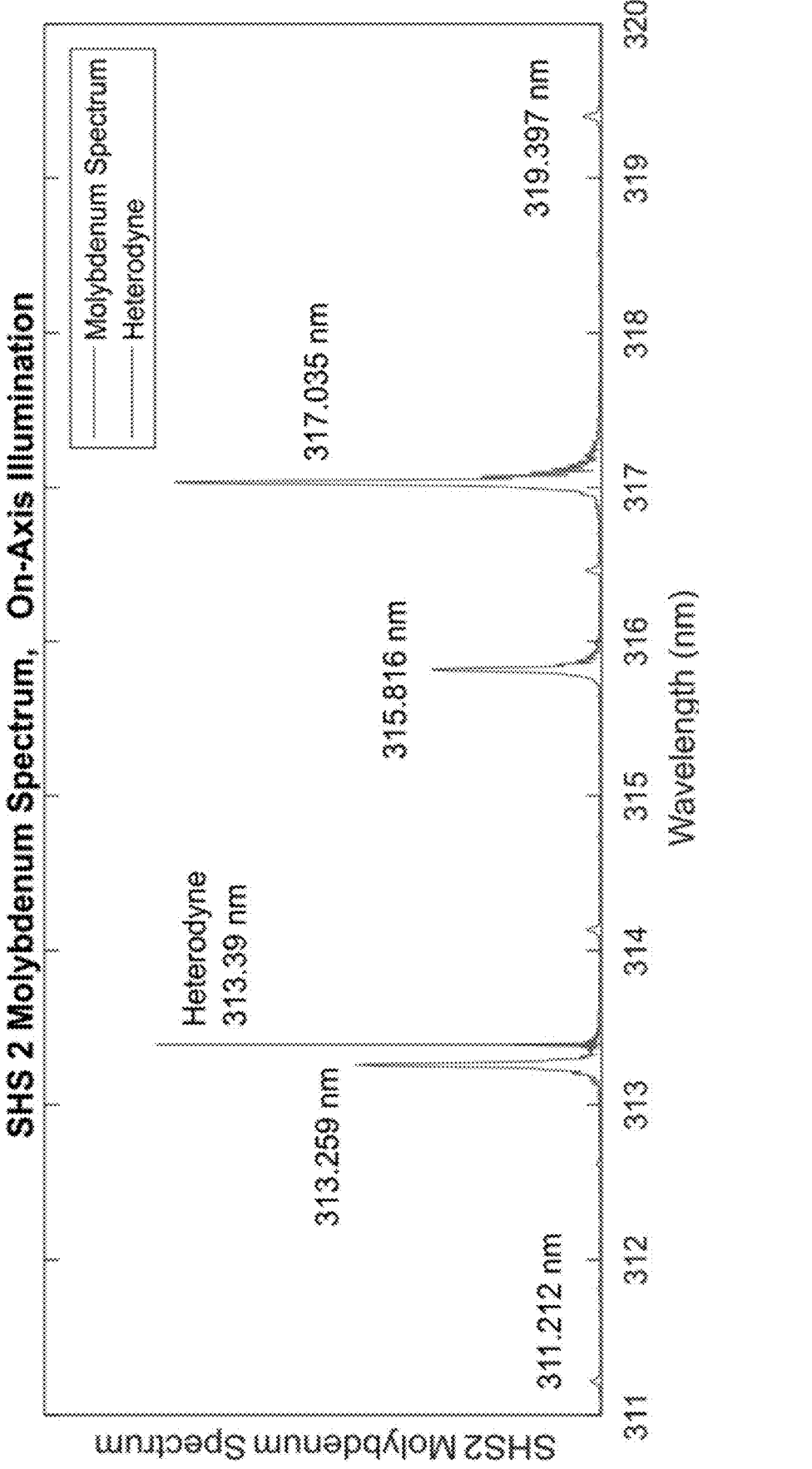

Two instruments were constructed and assessed, where bandwidth was different in each instrument, as effected by the heterodyne wavelength. Both instruments were tested against a molybdenum lamp with on-axis illumination. FIGS. 9A and 9B illustrate the interferograms produced by Instrument 1 (FIG. 9A) and Instrument 2 (FIG. 9B). The spectra generated by these devices are illustrated in FIGS. 10A-10B, where FIG. 10A illustrates the spectra from Instrument 1, and FIG. 10B illustrates the spectra from Instrument 2.

This example demonstrates that designing, modeling, and constructing SHS instruments described herein perform accurately without degrading quality, resolution, and other parameters.

DOCTRINE OF EQUIVALENTS

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the foregoing examples and descriptions of various preferred embodiments of the present invention are merely illustrative of the invention as a whole, and that variations in the components or steps of the present invention may be made within the spirit and scope of the invention. Accordingly, the present invention is not limited to the specific embodiments described herein, but, rather, is defined by the scope of the appended claims.

What is claimed is:

1. A device for performing spectroscopy, comprising:
a spatial heterodyne spectrometer (SHS) core comprising a beam-splitter, a first grating, and a second grating; wherein the beam-splitter, the first grating, and the second grating form a 90° angle with the beam-splitter at the vertex of the angle; and wherein the beam-splitter is configured to split the incoming light to the first grating and the second grating;
fore-optics aligned with the SHS core and configured to direct incoming light into the SHS core, wherein the fore-optics comprises a light collection lens and a collimating lens, wherein the light collection lens produces a minimum root mean square spot size at a field stop plane, and wherein an aperture stop is controlled at a position before the first power element in the fore-optics;
aft-optics aligned with the SHS core, such that light exiting the SHS core passes into the aft optics; and
a detector to image a fringe pattern generated by the SHS core.

2. The device for performing spectroscopy of claim 1, wherein the SHS core further comprises a first field widening prism and a second field widening prism, wherein the first field widening prism is located between the beam splitter and the first grating and the second field widening prism is located between the beam splitter and the second grating.

3. The device for performing spectroscopy of claim 2, wherein the first and second field widening prisms possess an angle for field widening based on a desired heterodyne wavelength, index of refraction of a construction material, and frequency of the first and second gratings.

4. The device for performing spectroscopy of claim 2, wherein: the first and second grating and the first and second field widening prisms are tilted to a position where a heterodyne wavelength gut ray angle of incidence from the first field widening prism and the first grating and a heterodyne wavelength gut ray angle of incidence from the second field widening prism and the second grating are zero at the detector.

5. The device for performing spectroscopy of claim 2, wherein the first field widened prism forms a first angle $\alpha$ with an edge of the beam-splitter and an edge of the first field widened prism proximal to the beam-splitter; wherein the second field widened prism forms a second angle $\alpha$ with an edge of the beam-splitter and an edge of the second field widened prism proximal to the beam-splitter, and wherein the first angle $\alpha$ and the second angle $\alpha$ are configured such that the fringe localization pattern is located at the detector.

6. The device for performing spectroscopy of claim 2, wherein the first grating is tilted to form a first angle $\beta$ between the first grating and a path of light directed toward the first grating; wherein the second grating is tilted to form a second angle $\beta$ between the second grating and a path of light directed toward the second grating; and wherein the first angle $\beta$ and the second angle $\beta$ are configured such that the fringe localization pattern is located at the detector.

7. The device for performing spectroscopy of claim 1, further comprising a filter located prior to the fore-optics such that incoming light passes through the filter into the fore-optics, wherein the filter is selected from a long pass filter, a short pass filter, and a band pass filter.

8. The device for performing spectroscopy of claim 1, wherein the fore-optics, the beam-splitter, and the first grating form an afocal system, wherein an exit pupil of the afocal system is located at the first grating and the detector is positioned so that the image at the exit pupil of the afocal system is re-imaged on to the detector.

9. The device for performing spectroscopy of claim 1, wherein:
the collimating lens is at least two lenses;
the light collection lens is an asphere lens; or
the collimating lens is at least two lenses and the light collection lens is an asphere lens.

10. The device for performing spectroscopy of claim 1, wherein the fore-optics comprises a light collection lens and a collimating lens wherein the collimating lens forms an optimized collimated beam at the grating.

11. The device for performing spectroscopy of claim 1, wherein the aft-optics, the beam-splitter, and the second grating form a double-gauss re-imager.

12. The device for performing spectroscopy of claim 1, wherein each optical component in the aft-optics has a diameter sufficient to allow a full field of view to pass through the aft-optics un-vignetted.

13. The device for performing spectroscopy of claim 1, further comprising a frame and barrel assembly housing the detector, the SHS core, the fore optics, and the aft optics;
optionally, wherein the frame and barrel assembly is 3D printed.

14. The device for performing spectroscopy of claim 1, wherein:
the SHS core, the fore optics, and the aft optics have a combined mass of less than 1000 grams;
the SHS core, the fore optics, the aft optics, and the detector have combined dimensions of less than or equal to 15 cm×15 cm×15 cm; or
the SHS core, the fore optics, and the aft optics have a combined mass of less than 1000 grams and the SHS core, the fore optics, the aft optics, and the detector have combined dimensions of less than or equal to 15 cm×15 cm×15 cm.

15. The device for performing spectroscopy of claim 1, wherein the device for performing spectroscopy has a mass of less than 2000 grams.

16. The device for performing spectroscopy of claim 1, wherein all optical components are constructed of the same material.

17. The device for performing spectroscopy of claim 16, wherein all optical components are constructed of fused silica, quartz, fused quartz, borosilicate glass, aluminosilicate glass, sapphire, calcium fluoride, alkali-aluminosilicate glass, or a glass ceramic.

18. A method of using a spectroscopy device, comprising:
obtaining a light from a sample into a spectroscopy device, wherein the spectroscopy device comprises:
a spatial heterodyne spectrometer (SHS) core comprising a beam-splitter, a first grating, and a second grating; wherein the beam-splitter, the first grating, and the second grating form a 90° angle with the beam-splitter at the vertex of the angle; and wherein the beam-splitter is configured to split the incoming light to the first grating and the second grating;
fore-optics aligned with the SHS core and configured to direct incoming light into the SHS core, wherein the fore-optics comprises a light collection lens and a collimating lens, wherein the light collection lens produces a minimum root mean square spot size at a field stop plane;

aft-optics aligned with the SHS core, such that light exiting the SHS core passes into the aft optics; and a detector to image a fringe pattern generated by the SHS core;

wherein an aperture stop is controlled at a position before the first power element in the fore-optics wherein the light passes through the fore-optics into the SHS core to image a fringe pattern on the detector; and analyzing the fringe pattern to identify a component within the sample.

19. The method of claim 18, wherein the sample is selected from one or more of a biological sample, an agricultural sample, an environmental sample, and a pharmaceutical sample; and wherein the light from the sample is selected from emission, reflection, absorption, fluorescence, and Rahman.

20. A method for making a spectroscopy device, comprising:

identifying an angle $\alpha$ for a field widening prism based on a desired heterodyne wavelength, index of refraction of a construction material, and frequency of a grating;

optimizing fore-optics as an afocal system, wherein the afocal system comprises a light collection lens, a collimating lens, a beam splitter, a first field widening prism, and a first grating and produces a minimum root mean square spot size at a field stop plane, and wherein an aperture stop is controlled at a position before the first power element;

optimizing aft optics as a re-imaging system, wherein the re-imaging system comprises at least one lens, the beam splitter, a second field widening prism, and a second grating; and optimizing a detector position, such that an image at a pupil of the fore-optics is re-imaged on the detector.

21. The method of claim 20, further comprising locating a filter located forward of the fore optics, such that incoming light passes through the filter then into the fore optics; and wherein optimizing the fore optics comprises:

locating an aperture stop between the filter and the fore optics;

locating an exit pupil of the fore optics to be located at the grating;

optimizing the light collection lens to produce a minimum root mean square spot size at a field stop plane; and optimizing the collimating lens to form an optimized collimated beam at the first grating.

22. The method of claim 20, wherein optimizing the aft optics comprises:

optimizing generalized distortion to zero; and minimizing a spot size at the detector.

* * * * *